US010962677B2

(12) United States Patent
Jegou

(10) Patent No.: US 10,962,677 B2
(45) Date of Patent: Mar. 30, 2021

(54) INSPECTION SYSTEM WITH SOURCE OF RADIATION AND METHOD

(71) Applicant: SMITHS HEIMANN SAS, Vitry sur Seine (FR)

(72) Inventor: Guillaume Jegou, Vitry sur Seine (FR)

(73) Assignee: SMITHS HEIMANN SAS, Paris (FR)

( * ) Notice: Subject to any disclaimer, the term of this patent is extended or adjusted under 35 U.S.C. 154(b) by 0 days.

(21) Appl. No.: 16/321,194

(22) PCT Filed: Jul. 27, 2017

(86) PCT No.: PCT/GB2017/052198
§ 371 (c)(1),
(2) Date: Jan. 28, 2019

(87) PCT Pub. No.: WO2018/020257
PCT Pub. Date: Feb. 1, 2018

(65) Prior Publication Data

US 2019/0219730 A1 Jul. 18, 2019

(30) Foreign Application Priority Data

Jul. 28, 2016 (GB) .................................. 1613069.2

(51) Int. Cl.
*G01V 5/00* (2006.01)
*H05G 2/00* (2006.01)
(Continued)

(52) U.S. Cl.
CPC ........... *G01V 5/0041* (2013.01); *G01N 23/04* (2013.01); *G01N 23/06* (2013.01); *G01N 23/10* (2013.01);
(Continued)

(58) Field of Classification Search
CPC .. G01V 5/0016; G01V 5/0041; G01V 5/0069; G01N 23/04; G01N 23/05; G01N 23/06; G01N 23/10
See application file for complete search history.

(56) References Cited

U.S. PATENT DOCUMENTS

| | | | | |
|---|---|---|---|---|
| 7,840,360 | B1 | 11/2010 | Micheels et al. | |
| 2003/0016783 | A1 * | 1/2003 | Grodzins | G01V 5/0025 378/57 |
| 2008/0030731 | A1 | 2/2008 | Jin et al. | |

FOREIGN PATENT DOCUMENTS

| | | | |
|---|---|---|---|
| CN | 102519988 | A | 6/2012 |
| GB | 997338 | A | 7/1965 |

(Continued)

OTHER PUBLICATIONS

International Search Report and Written Opinion for PCT/GB2017/052198, dated Dec. 6, 2017.

(Continued)

*Primary Examiner* — Chih-Cheng Kao
(74) *Attorney, Agent, or Firm* — Kevin E. West; Advent, LLP

(57) ABSTRACT

In examples, it is disclosed an inspection system comprising: a secondary source of radiation configured to generate secondary electromagnetic radiation for inspection of a load in response to being irradiated by primary electromagnetic radiation from a primary generator of electromagnetic radiation; and one or more detectors configured to detect radiation from the load after interaction with the secondary inspection beam.

18 Claims, 7 Drawing Sheets

(51) Int. Cl.

| | |
|---|---|
| ***G01N 23/10*** | (2018.01) |
| ***G01N 23/04*** | (2018.01) |
| ***G01N 23/06*** | (2018.01) |
| ***G21K 1/02*** | (2006.01) |
| *H01J 35/00* | (2006.01) |

(52) U.S. Cl.
CPC ........... *G01V 5/0016* (2013.01); *G21K 1/025* (2013.01); *H05G 2/00* (2013.01); *H01J 35/00* (2013.01); *H01J 2235/08* (2013.01)

(56) References Cited

FOREIGN PATENT DOCUMENTS

| | | | |
|---|---|---|---|
| GB | 2403388 | A | 12/2004 |
| WO | 2008140473 | A2 | 11/2008 |

OTHER PUBLICATIONS

Dermody, G.S. et al., "The Characterisation of a Secondary Fluorescence X-ray Tube for Medical Imaging, Security Screening and Analytical Applications," Nuclear Science Symposium Conference Record, 2000 IEEE, Lyon, Published 2000, pp. 23/29-23/3.
Search Report for Application No. GB1613069.2, dated Nov. 17, 2016.

* cited by examiner

INSPECTION SYSTEM WITH SOURCE OF RADIATION AND METHOD

FIELD OF INVENTION

The present disclosure relates, but is not limited, to systems and methods for inspecting a load with a source of radiation.

BACKGROUND

Inspection systems use inspection radiation transmitted through a load (such as a vehicle) for inspecting cargo of the load, for example to detect hidden objects (such as weapons or dangerous material).

However objects placed in the line of transmission of materials which are opaque to the radiation or of materials which eventually appear dark on the images are difficult to detect on a view by transmission.

Aspects of the present invention address some of the above issues.

SUMMARY OF INVENTION

Aspects and embodiments of the invention are set out in the appended claims. These and other aspects and embodiments of the invention are also described herein.

PRESENTATION OF THE FIGURES

Embodiments of the disclosure will now be described, by way of example only, with reference to the accompanying drawings, in which.

Figure 6B:
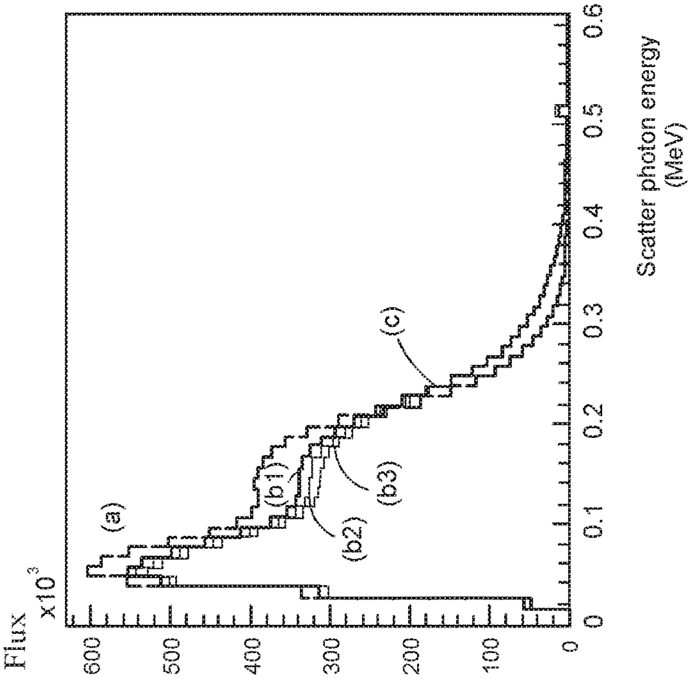
Figure 6A:
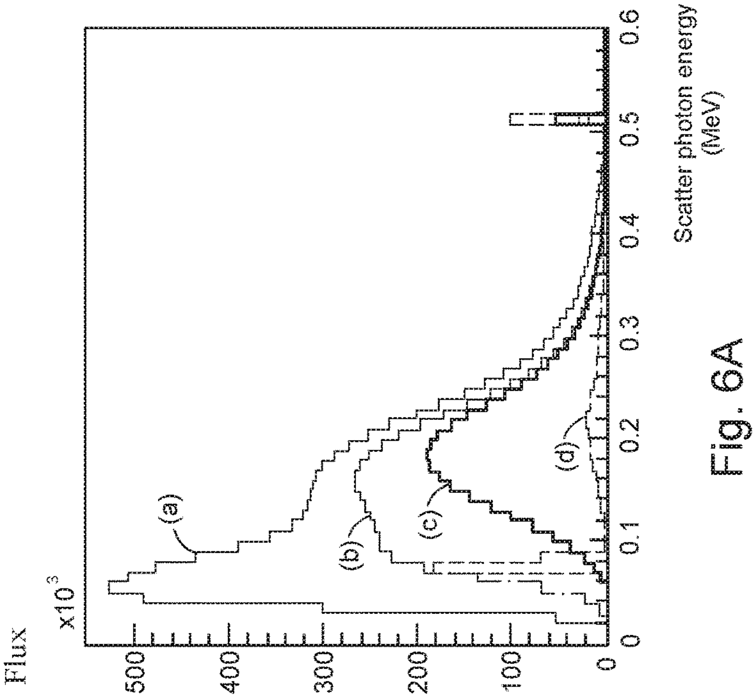
Figure 7:
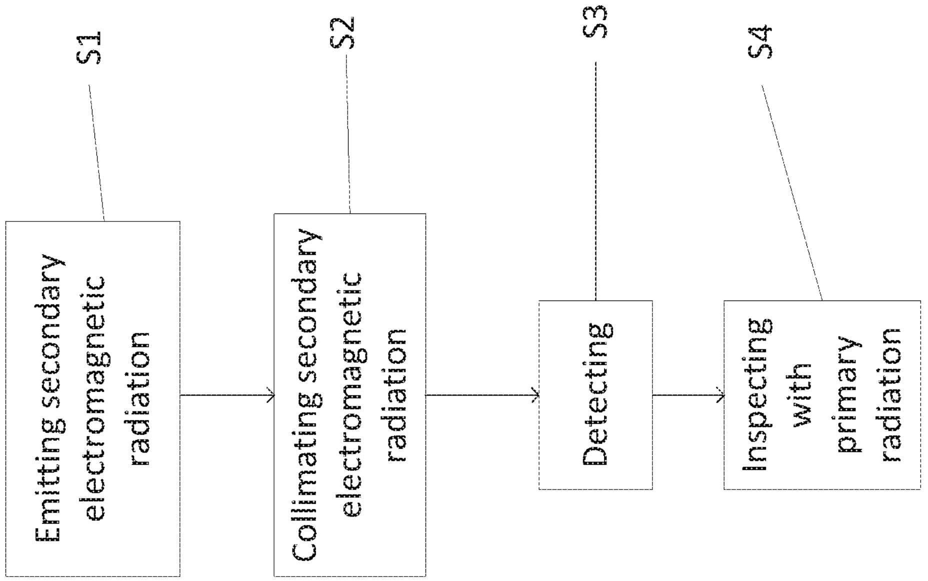
Figure 8B:
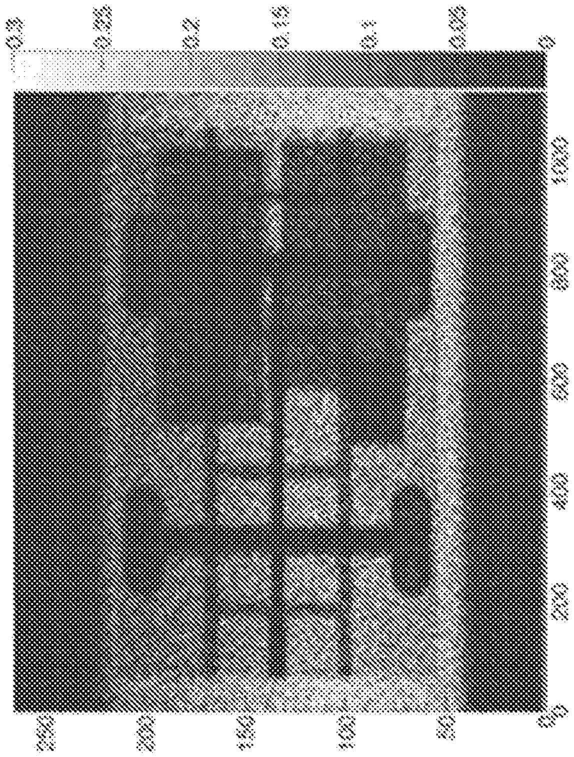
Figure 8A:
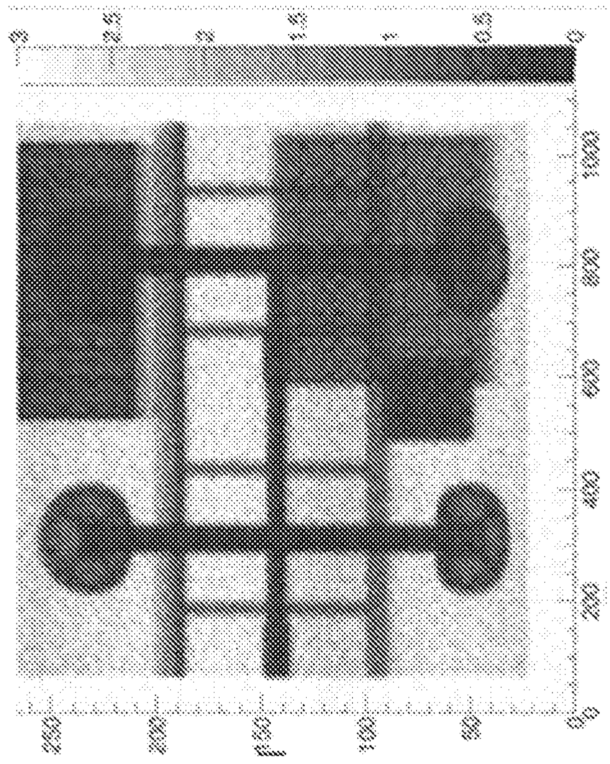

FIG. 6A schematically illustrates the energy distribution for a scatter beam from different secondary sources, with different materials such as polymethyl methacrylate PMMA (a), aluminium (b), steel (c) and lead (d);

FIG. 6B schematically illustrates the energy distribution for a scatter beam from a secondary source in PMMA, for different primary radiation energy, such as 2 MeV (a), 3 MeV (b1), 4 MeV (b2), and 5 MeV (b3) and 6 MeV (d);

FIG. 7 illustrates a flowchart which illustrate an example method for inspecting a load; and FIG. 8A and FIG. 8B show examples of images obtained with a system of any aspect of the disclosure.

In the drawings, like elements are referred to by the same numerical references.

DESCRIPTION OF EXAMPLE EMBODIMENTS

Overview

Embodiments of the present disclosure relate to a system for inspection of a load. The system comprises at least one source of radiation which emits electromagnetic radiation in response to being irradiated by electromagnetic radiation. The electromagnetic radiation emitted by the source may be collimated for inspection of the load, and detectors detect radiation after interaction with the load.

The system may be used in apparatus comprising at least one generator configured to generate electromagnetic radiation for irradiation of the source, the source thus acting like a target for the radiation generated by the generator. In some examples, the electromagnetic radiation generated by the generator may also be used for inspection of the load and/or another load. In some examples the apparatus may comprise a plurality of systems comprising a source and one or more detectors, such that in some examples a single generator (some generators may be costly) may irradiate a plurality of sources. In some examples, a plurality of generators may irradiate a single source.

In some examples, a plurality of views of one or more loads may be obtained using the one or more systems and for example a same generator of electromagnetic radiation. Hidden objects may be detected. In examples where a single generator is used, costs of the apparatus may be reduced because the same generator is used for the plurality of views.

The one or more systems may be placed at different given positions in the apparatus, depending on the desired views.

The at least one generator of radiation may be placed at different given positions in the apparatus, depending on the desired views.

DETAILED DESCRIPTION OF EXAMPLE EMBODIMENTS

As illustrated in the Figures, the system may be described with reference to an orthonormal reference OXYZ, axis OZ being the ascending vertical, a plane YOZ being vertical, a plane XOY being horizontal, and a plane XOZ being vertical.

Figure 1:
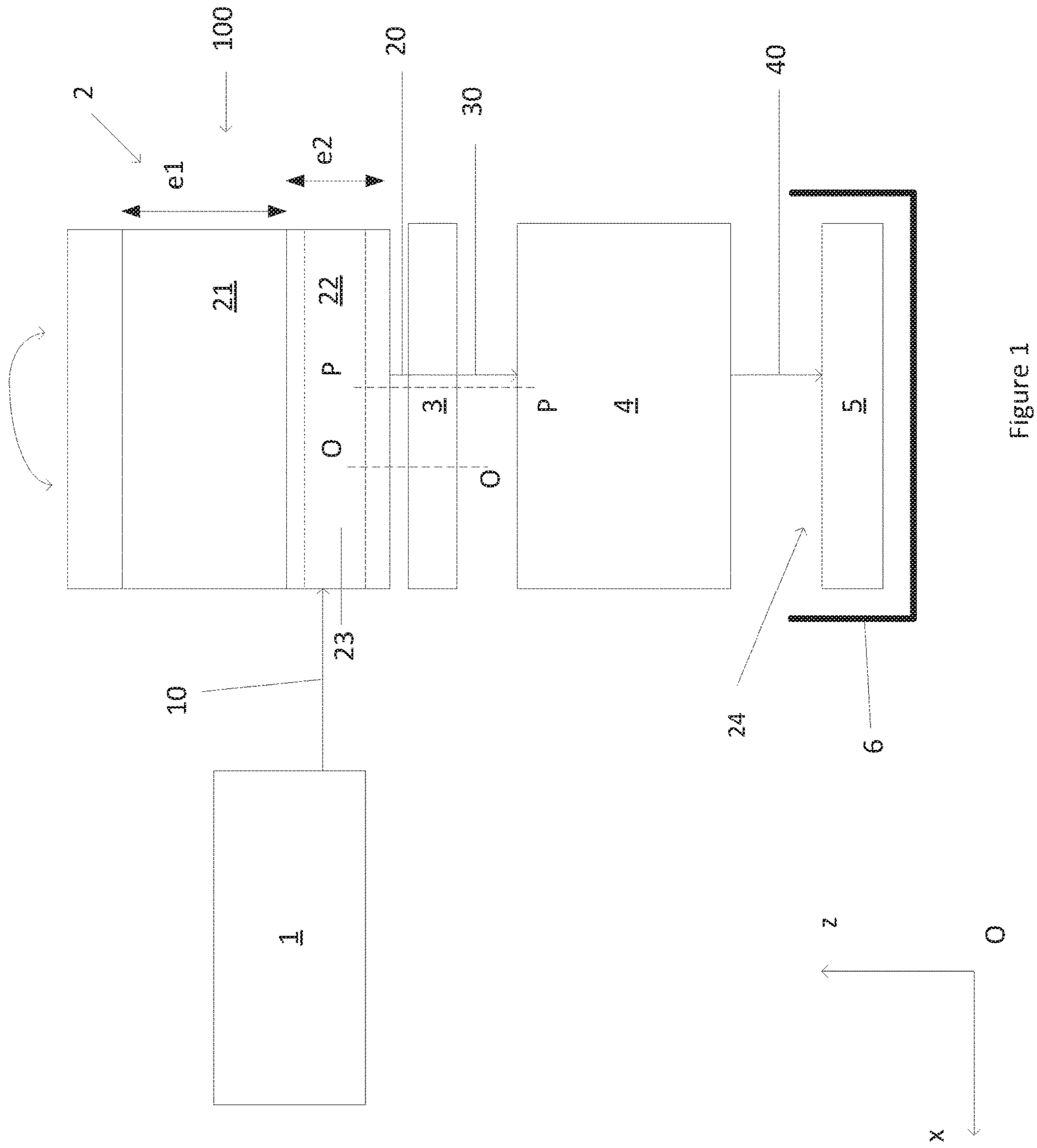
FIG. 1 shows an example inspection system, in a front view.

In the example of FIG. 1, an inspection system 100 comprises at least one secondary source 2 of radiation.

The secondary source 2 is configured to emit secondary electromagnetic radiation 20 for inspection of a load 4. The secondary electromagnetic radiation 20 is emitted by the source 2 in response to the source 2 being irradiated by primary electromagnetic radiation 10 from at least one primary generator 1 of electromagnetic radiation (for example by Compton scattering and pair production in the case of the primary electromagnetic radiation 10 comprising X-ray and/or gamma radiation).

In the present disclosure, a single generator 1 is described in detail, but it should be understood that a plurality of generators may irradiate a same secondary source 2. Similarly, in the present disclosure, a single source 2 is described in detail, but it should be understood that a plurality of sources may be irradiated by a same generator or by a plurality of generators.

The secondary source 2 is configured to define at least three parameters including a focal spot size (associated with a size of a zone emitting the secondary radiation), secondary radiation intensity, and a spectrum of the secondary radiation. In some examples, the secondary source 2 comprises one or more scattering elements. The above three parameters may be controlled using the one or more scattering elements. Each scattering element is configured to define a scattering thickness and/or be defined by a scattering material. In some examples, when the secondary source 2 comprises a plurality of elements, at least one of the scattering elements is different in scattering thickness and/or in scattering material from one or more other scattering elements of the secondary source.

In the example of FIG. 1, the secondary source 2 comprises two scattering elements 21 and 22. In the example of FIG. 1, the scattering element 21 is different, e.g. in scattering thickness e1, from scattering element 22 of the secondary source, i.e. e1≠e2. In some examples, the scattering element 21 may be different, e.g. in scattering material, from scattering element 22 of the secondary source, i.e. the material of element 21 is different from the material of element 22.

Non-limiting examples include polymethyl methacrylate (PMMA), aluminium, steel and lead, and a gas such as air. Examples of material with relatively high scattering include material with a Z number comprised between 1 and 20. FIG. 6A schematically illustrates the energy distribution for a scatter beam from different secondary sources, with different materials such as PMMA (a), aluminium (b), steel (c) and lead (d). Other materials are envisaged.

In the example of FIG. 1, the secondary source comprises the element 21 of a greater thickness e1 of lead (relatively low scattering) and the element 22 of a smaller thickness e2 of PMMA. The scattering generated by the element 21 is small compared to the scattering created by the element 22, and the scattering is thus mainly generated in the smaller thickness e2.

It should be understood that different properties of the secondary radiation (such as the energy, the energy distribution) may be obtained, depending on the elements of the source 2.

Alternatively or additionally and as illustrated in FIG. 1, the secondary source 2 defines a projection area 24 on the (XOY) plane (e.g. on one or more detectors 5 described in greater detail below). The projection area 24 may be associated with e.g. the focal spot size of the secondary source 2. In some examples, the secondary source 2 may be movable with respect to the one or more detectors (such as around a direction perpendicular to the plane (XOZ) in FIG. 1, see the double arrow) to control an extent of the projection area 24. At least one of the above three parameters may be controlled using a variation of the projection area.

In some examples, the secondary source 2 may be configured to emit X-ray radiation, in response to being irradiated by X-ray radiation from the generator 1. Non-limiting examples of irradiation energy from the generator 1 may be comprised between 50 keV and 15 MeV, such as 2 MeV to 6 MeV, for example for irradiating a source 2 in PMMA. FIG. 6B schematically illustrates the energy distribution for a scatter radiation from a secondary source in PMMA, for different primary radiation energy, such as 2 MeV (a), 3 MeV (b1), 4 MeV (b2), 5 MeV (b3) and 6 MeV (d). Other energies are envisaged. In some examples, the secondary source of radiation is configured to emit ionizing secondary electromagnetic radiation in response to being irradiated by primary electromagnetic radiation. In some examples, the secondary source 2 may be configured to emit γ-ray radiation, in response to being irradiated by γ-ray radiation from the generator 1, and/or neutron radiation, in response to being irradiated by neutron radiation from the generator 1.

In some examples, primary neutron radiation would have an energy comprised between 0 MeV and 15 MeV. In such examples, the secondary source 2 may comprise a highly hydrogenated material, such as polyethylene. In such examples, shielding elements (such as a collimator described in greater detail below) may comprise a borated material, such as boron carbide.

In the example of FIG. 1 and as shown by the dotted lines, the source 2 comprises a target 23 for a beam of primary electromagnetic radiation 10 forming, as described in greater detail below, a pencil of rays or forming a fan beam.

In the example of FIG. 1, the system 100 may further comprise a collimator 3 configured to collimate the secondary electromagnetic radiation 20 into a secondary inspection beam 30 configured to irradiate the load 4.

The load 4 may be any type of object and/or any type of container, such as a holder, a vehicle or a vessel, or a box, etc. The load may thus be, as non-limiting examples, a trailer and/or a palette (for example a palette of European standard, of US standard or of any other standard) and/or a train wagon and/or a tank and/or a boot of a vehicle such as a truck, a van and/or a car and/or a train, and/or the load 4 may be a "shipping container" (such as a tank or an ISO container or a non-ISO container or a Unit Load Device (ULD) container). It is thus appreciated that the load 4 may be any type of container, and thus may be a suitcase in some examples.

In some examples, the system 100 is configured to cause inspection of a cargo (not shown in the Figures) located inside of the load through a material (usually steel) of walls of the load 4, e.g. for detection and/or identification of the cargo.

The system 100 may be configured to cause inspection of the load, in totality (i.e. the whole load is inspected) or partially (i.e. only a chosen part of the load is inspected, e.g., typically, when inspecting a vehicle, a cabin of the vehicle may not be inspected, whereas a rear part of the vehicle is inspected).

As described in greater detail below, the system 100 may be mobile and may be transported from a location to another location (the system 100 may comprise an automotive vehicle). Alternatively or additionally, the inspection system 100 may be static with respect to the ground and cannot be displaced.

As described in further detail below, in some examples the collimator 3 may be configured to collimate the secondary electromagnetic radiation 20 into a fan beam 30.

In the example of FIG. 1, alternatively or additionally, the collimator 3 is defined by a main direction (O-O) of collimation. In some examples, the collimator 3 may be configured to collimate the secondary electromagnetic radiation 20 into a secondary inspection beam 30 defined by a main direction of propagation (P-P) of rays parallel to the main direction of collimation (O-O), as described in greater detail below.

In the example of FIG. 1, the system 100 further comprises one or more detectors 5 configured to detect radiation 40 from the load 4 after interaction with the secondary inspection beam 30. The one or more detectors 5 may comprise, amongst other conventional electrical elements, radiation detection lines, such as X-ray detection lines.

In some examples, the secondary source 2 of radiation is configured to generate the secondary inspection radiation 20 for inspection of the load by transmission of the secondary inspection radiation 30 and 40 through the load 4.

It should be understood that the primary electromagnetic radiation 10 for irradiation of the secondary source 2 may not interact with the load 4, and the system 100 may be configured to avoid disturbance of the radiation for irradiation of the source 2.

In the example of FIG. 1, the system 100 comprises shielding 6 configured to inhibit radiation from the primary generator 1, such as the primary electromagnetic radiation 10, from reaching the one or more detectors 5. The shielding 6 is configured to block or at least attenuate the radiation 10. In an example where the secondary inspection radiation 20 is generated for inspection of the load 4 by transmission of the secondary inspection radiation 30 through the load 4, the shielding 6 may be configured to inhibit (i.e. block or at least attenuate) radiation other than the radiation 30 and 40 transmitted through the load 4 from reaching the one or more detectors 5. As described in greater detail below, the shielding 6 may also inhibit radiation scattered by a transmission detection line (e.g. comprising one or more primary detectors 51 described in more detail below) from reaching the one or more detectors 5, when such a transmission detection line is present. The shielding may comprise lead but other materials are envisaged.

As illustrated in the examples of FIGS. 2 to 5, apparatus 1000 may comprise at least one primary generator 1 configured to generate primary electromagnetic radiation 10, and at least one inspection system 100 of any one of the aspects of the present disclosure.

It should be understood that in the present disclosure and in the Figures, a single system 100 is described and illustrated, but the apparatus 1000 may comprise a plurality of systems, such as two or more systems 100. Each of the systems 100 of the apparatus 1000 may be associated with a view of one or more loads. Similarly one or more generators may irradiate a plurality of sources 2.

Figure 2:
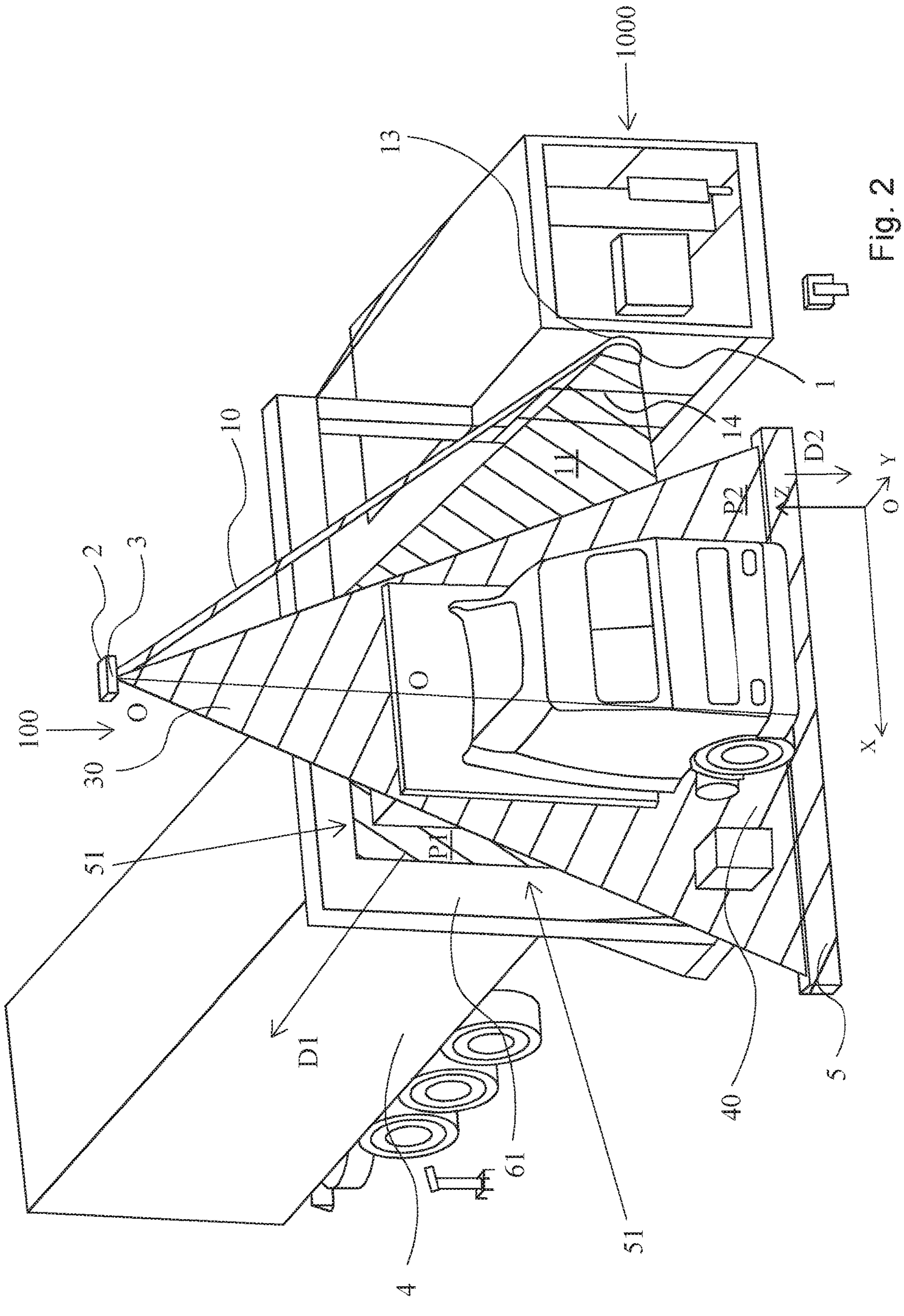
FIG. 2 shows an example inspection system in an example apparatus, in a view in perspective.

In the example of FIG. 2, the primary generator 1 is configured to generate the beam of primary electromagnetic radiation 10 for irradiation of the secondary source 2 of electromagnetic radiation. In some examples, the primary generator 1 comprises an accelerator, i.e. may be configured to produce and accelerate an electron beam on a metal solid (such as tungsten and copper) to generate the photons of the primary electromagnetic radiation 10 (by the so-called braking radiation effect, also called "Bremsstrahlung"). Alternatively or additionally, the primary generator 1 may be configured to be activated by a power supply, such as a battery of an apparatus comprising a vehicle and/or an external power supply.

In the example of FIG. 2, the primary generator 1 is configured to generate the beam of primary electromagnetic radiation 10 forming a pencil of rays. In the example of FIG. 2, the primary generator 1 comprises a collimator 13 for collimating the beam of primary electromagnetic radiation 10 for irradiation of the secondary source 2 of electromagnetic radiation, e.g. into the pencil of rays.

In the example of FIG. 2, the primary generator 1 is further configured to generate an inspection beam 11 of primary electromagnetic radiation for irradiation of a load to inspect (i.e. the load 4 in the example of FIG. 2). In the example of FIG. 2, the primary generator 1 is configured to generate the inspection beam 11 of primary electromagnetic radiation forming a fan beam. The primary generator 1 may comprise a primary collimator 14 for collimating the inspection beam 11 of primary electromagnetic radiation for irradiation of the load 4, e.g. into the fan beam.

The apparatus 1000 comprises one or more primary detectors 51 configured to detect radiation from the load 4 after interaction with the inspection beam 11 of primary electromagnetic radiation. In some examples, the primary generator 1 is configured to generate the inspection beam 11 of primary electromagnetic radiation for inspection of the load by transmission of inspection beam 11 of primary electromagnetic radiation through the load 4. The inspection beam 11 of primary electromagnetic radiation 10 may comprise X-ray radiation. The primary generator 1 may be configured to generate ionizing primary electromagnetic radiation. The inspection beam 11 of primary electromagnetic radiation 10 may comprise γ-ray radiation and/or neutron radiation. Non-limiting examples of irradiation energy from the generator 1 may be comprised between 50 keV and 15 MeV, such as 2 MeV to 6 MeV, for example. Other energies are envisaged. In some examples the energy of the X-ray radiation may be comprised between 50 keV and 15 MeV, and the dose may be comprised between 2 mGy/min and 30 Gy/min (Gray). In some examples, the power of the generated radiation may be e.g., between 100 keV and 9.0 MeV, typically e.g. 2 MeV, 3.5 MeV, 4 MeV, or 6 MeV, for a steel penetration capacity e.g., between 40 mm to 400 mm, typically e.g., 300 mm (12 in). In some examples, the dose may be e.g., between 20 mGy/min and 120 mGy/min. In some examples, the power of the X-ray generator may be e.g., between 4 MeV and 10 MeV, typically e.g., 9 MeV, for a steel penetration capacity e.g., between 300 mm to 450 mm, typically e.g., 410 mm (16.1 in). In some examples, the dose may be 17 Gy/min.

In the example of FIG. 2, the primary generator 1 is configured to generate the inspection beam 11 of primary electromagnetic radiation 10 for inspection of the same load 4 as the load 4 irradiated by the secondary electromagnetic radiation 20 (or beam 30 after collimation by the collimator 3).

Figure 4:
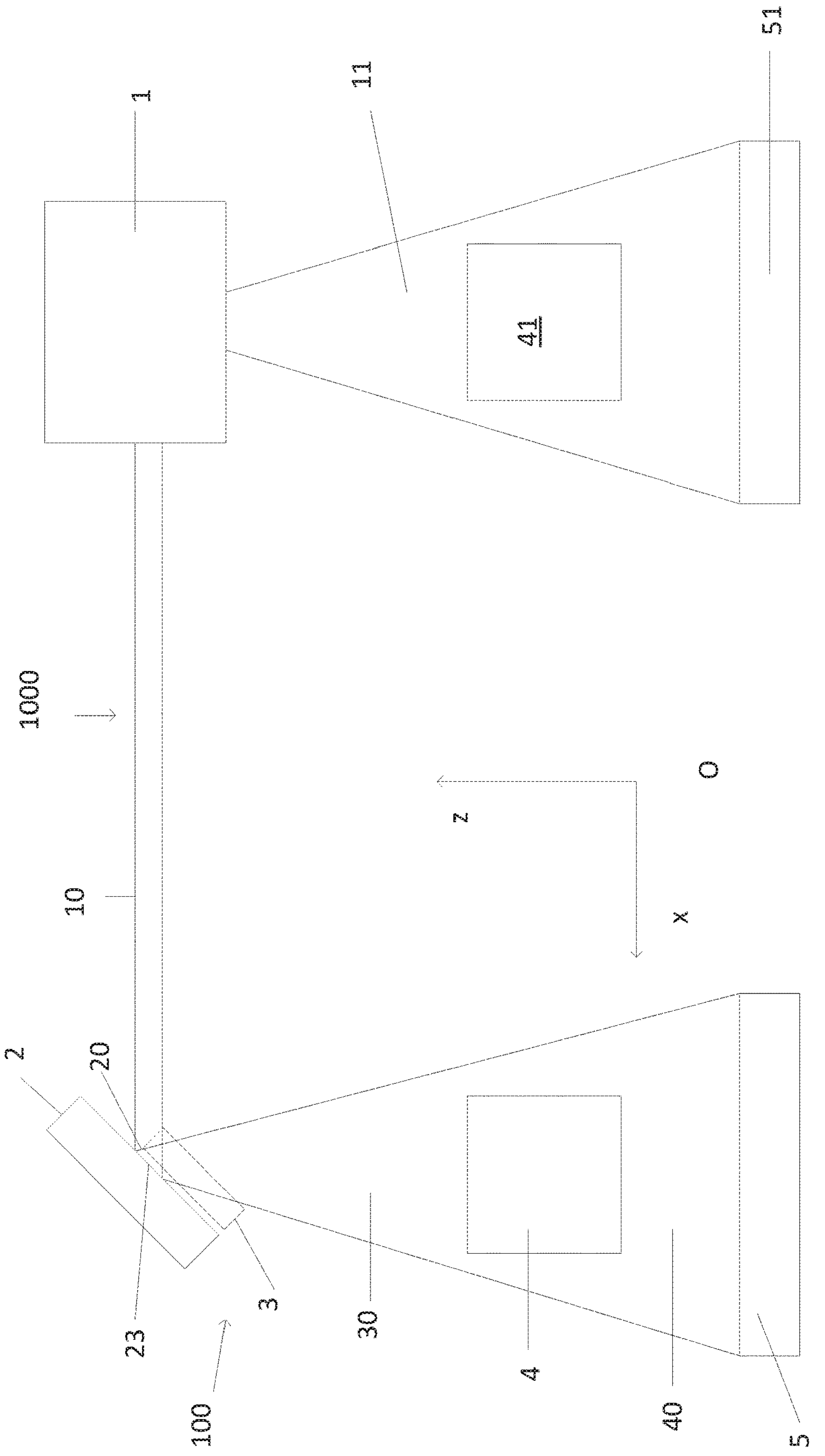
FIG. 4 shows an example inspection system in an example apparatus, in a front view.

It should be understood that the primary generator 1 may be configured to generate an inspection beam of primary electromagnetic radiation for inspection of one or more first loads which are different from one or more second loads irradiated by the secondary electromagnetic radiation. In the example of FIG. 4 described in greater detail below, the primary generator 1 is configured to generate the inspection beam 11 of primary electromagnetic radiation 10 for a first load 41 which is different from the second load 4 irradiated by the secondary electromagnetic radiation 20 (or beam 30 after collimation by the collimator 3).

As described in further detail below, in some examples the one or more first loads and/or the one or more second loads may be movable with respect to apparatus and/or the detection system 100 (for example in a direction of the axis OZ in the Figures).

In the example of FIG. 2, the apparatus 1000 comprises shielding 61 configured to inhibit radiation from the secondary source 2 (such as the secondary electromagnetic radiation 20 and/or the secondary inspection beam 30 and/or the transmitted radiation 40) and/or scattered by the one or more detectors 5 from reaching the one or more detectors 51. The shielding 61 is configured to block or at least attenuate the radiation from the secondary source 2 and/or the one or more detectors 5. In an example where the primary inspection beam 11 is generated for inspection of the load 4 by transmission, the shielding 61 may be configured to inhibit (i.e. block or at least attenuate) radiation other than the radiation 11 transmitted through the load 4 from reaching the one or more detectors 51. The shielding 61 may comprise lead but other materials are envisaged. In the example of FIG. 2, the shielding 61 is illustrated at the level of the primary detector 51. Alternatively or additionally, it should be understood that the shielding 61 may comprise parts at the level of the secondary source 2 (not illustrated in the Figures).

Alternatively or additionally, the primary detectors 51 may define a plane P1, and the one or more detectors 5 may define a plane P2, respectively. In the example of FIG. 2, the plane P1 defined by the one or more primary detectors 51 is distant from the plane P2 defined by the one or more detectors 5 of each of the at least one inspection system. The distance between the planes P1 and P2 at least attenuates the amount of radiation (e.g. from the inspection beam 11 and/or scattered by the primary detectors 51) reaching the one or more detectors 5 and/or at least attenuates the amount of radiation (e.g. from the inspection beam 30 or 40 and/or scattered by the one or more detectors 5) reaching the one or more detectors 51. A distance between P1 and P2 may be of the order of 1 m (such as 1 m, 2 m or 3 m) when the load 4 to inspect is a truck for instance. Other distances are envisaged.

In some examples, the distance between the plane P1 and the plane P2 may be used in a scan mode of operation, as explained below. The distance between the plane P1 and the plane P2 may be e.g. 2 m or 3 m, and the plane P2 may define a plane of inspection with a lower dose (e.g. because the dose is emitted by scattering) and may be used to scan a cabin (and/or driver) of a vehicle to scan (such as a truck). The plane P1 may define a plane of inspection with a higher dose (e.g. because the dose is generated by the generator) and may be used to scan a trailer of the vehicle.

Alternatively or additionally, the one or more primary detectors 51 are configured to define a primary main direction D1 of detection of the load 4, and the one or more detectors 5 of each of the at least one inspection system 100 are configured to define a secondary main direction D2 of detection of the load 4.

Figure 3:
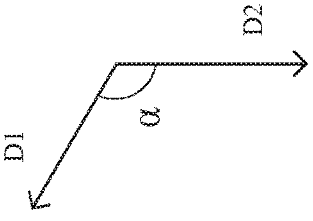
FIG. 3 shows an angle between a primary main direction of detection and a secondary main direction of detection.

In some examples and as illustrated in FIG. 3, the primary main direction D1 of detection and the secondary main direction D2 of detection define an angle α between them (e.g. α≠0). In FIG. 2, the angle α may be such that the primary main direction D1 of detection corresponds to a side view the load 4 and the secondary main direction D2 of α corresponds to a top view of the load 4. It should be understood that in the present disclosure, "top" and "side" refer to a position of the directions of detection with respect to the load and to each other. A top view may not be strictly vertical (e.g. not strictly parallel to the (OZ) axis) and may form an angle with respect to the (OZ) axis, and still be referred to as a top view. Similarly, a side view may not be strictly horizontal (e.g. not strictly parallel to the (XOY) plane) and may form an angle with respect to the (OY) and/or (OZ) axes, and still be referred to as a top view.

It should be understood that other configurations of a are envisaged. In some examples, the one or more first loads extend in a first direction of inspection (e.g. corresponding to a direction of a movement of the one or more first loads) and/or the one more second loads extend in a second direction of inspection (e.g. corresponding to a direction of a movement of the one or more second loads). In some examples, a may be such that, the primary main direction D1 of detection corresponds to a side view and/or a top view of the first load, and the secondary main direction D2 of detection corresponds to a top view and/or a side view of the second load. It should be understood that in the context of the present disclosure a side view having an angle different from 0 with respect to the horizontal axis OX may provide an enhanced view of hidden objects which may be difficult to detect (e.g. using strictly side views only), such as objects hidden in doors of a vehicle.

Other configurations are envisaged.

In examples where the first load comprises the second load (or the second load comprises the first load), the apparatus may provide at least two views (e.g. top view and side view) of the load, with a single radiation generator.

In examples where the first load is a different load from the second load, the apparatus may provide at least one view (e.g. top view) of the at least two loads, with a single radiation generator (see FIG. 4, described below).

The apparatus of FIG. 4 comprises the same components as the apparatus of FIG. 3 and the components in common will not be described for clarity. In the apparatus 1000 of FIG. 4, the first load 41, irradiated by the primary inspection beam 11 along the vertical axis OZ, is different from the second load 4, irradiated by the secondary inspection beam 30 and 40 along the vertical axis OZ.

It will be appreciated that in FIG. 4 the primary generator 1 is configured to generate the beam 10 of primary electromagnetic radiation forming a pencil of rays. The secondary source 2 comprises a target 23 for the beam 10 of primary electromagnetic radiation forming the pencil of rays.

Figure 5:
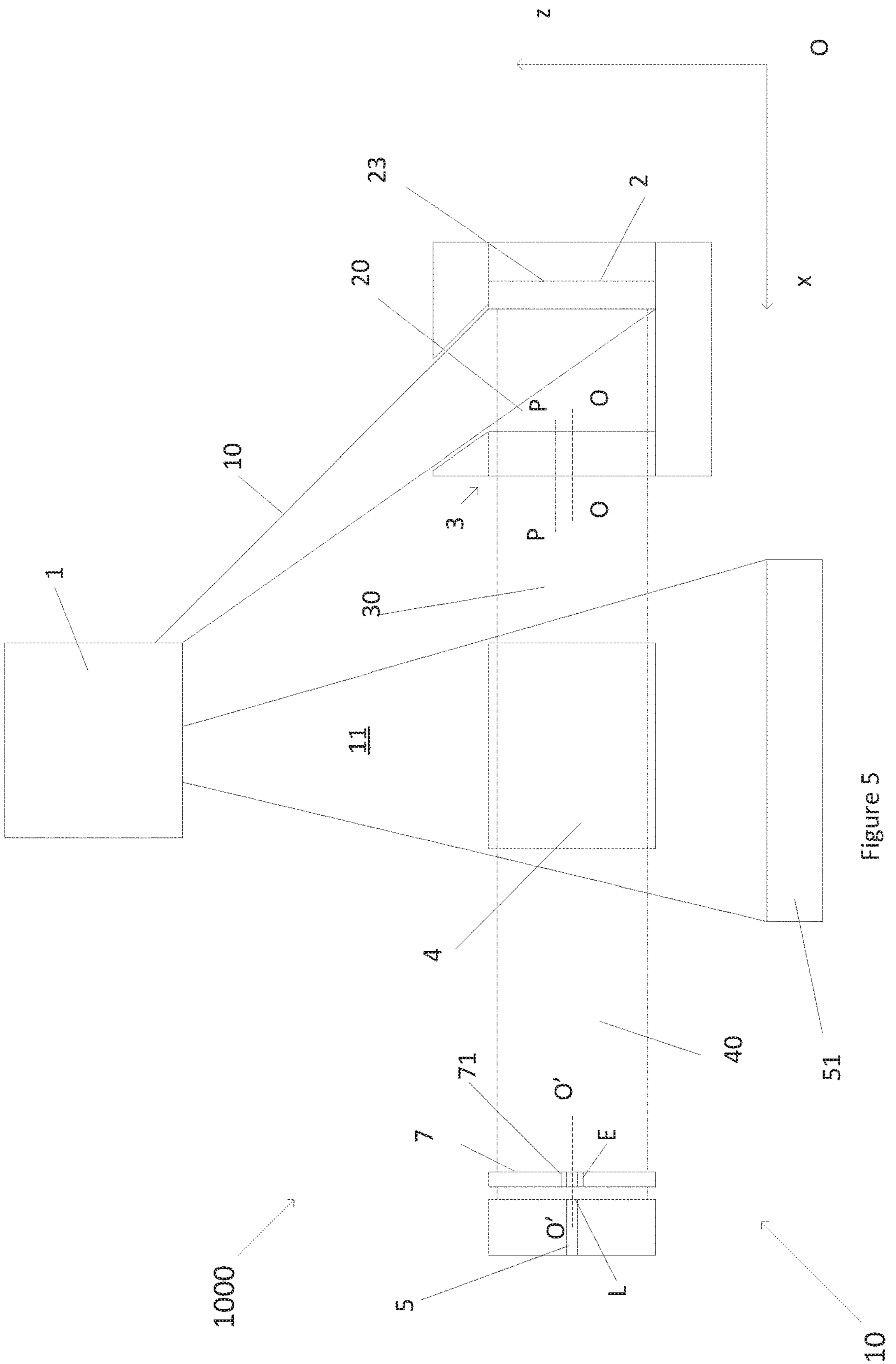
FIG. 5 shows an example inspection system in an example apparatus, in a front view.

The apparatus of FIG. 5 comprises the same components as the apparatus of FIG. 3 and the components in common will not be described for clarity. In the apparatus 1000 of FIG. 5, the load 4 irradiated by the primary inspection beam 11 along the vertical axis OZ is the same as the load 4 irradiated by the secondary inspection beam 30 and 40 along the horizontal axis OX.

It will be appreciated that in FIG. 5 the primary generator 1 is configured to generate the beam 10 of primary electromagnetic radiation forming a fan beam. The secondary source 2 comprises a target 23 for the beam 10 of primary electromagnetic radiation forming the fan beam.

In FIG. 5, the collimator 3 is defined by the main direction (O-O) of collimation, such that the collimator 3 is configured to collimate the secondary electromagnetic radiation 20 into a beam 30 defined by a main direction (P-P) of propagation of rays, (P-P) being parallel to the main direction (O-O) of collimation. In some examples, alternatively or additionally, the collimator 3 may be configured to inhibit (e.g. block or at least attenuate) rays which are non-parallel to the direction (O-O) of collimation, and the collimator 3 reduces noise.

The one or more detectors 5 further comprise one or more detector collimators 7, each collimator being associated with a respective detector 5. Each one of the one or more detector collimators 7 is defined by a main direction of collimation (O'-O'), the main direction (O'-O') of collimation of the detector collimators 7 being parallel with the main direction (O-O) of collimation of the collimator 3. The detectors 5 of the apparatus of FIG. 5 detect photons which propagate in the given direction (O'-O'). It should be understood that in the example of FIG. 5, the beams 30 and 40 detected by the one or more detectors 5 have parallel rays. Images generated from data detected by the one or more detectors 5 may be without parallax, and certain types of hidden objects may be detected with greater success than from images having parallax.

In the example of FIG. 5, each of the detector collimators 7 associated with a respective detector 5 comprises two partitions 71. The partitions 71 extend in a main direction parallel to the main direction of collimation (O'-O'), and define an aperture for letting rays parallel to the main direction of collimation (O'-O') reach the respective detector 5. Each partition 71 of the detector collimator associated with a respective detector 5 is configured to inhibit (e.g. block or at least attenuate) radiation not parallel to the main direction of collimation (O'-O') from reaching the respective detector 5. Each partition 71 may comprise a sheet of lead, but other configurations and materials are envisaged.

A ratio r of a dimension E of each of the partitions in a direction parallel to the main direction of collimation (O'-O') over a dimension Δ (such as a width of the detector, e.g. in a direction of a desired resolution) of the associated detector in a plane perpendicular to the direction of collimation (O'-O') may be such that:

$$2 \le r = \frac{E}{\Delta} \le 50.$$

The system and apparatus may provide at least one relatively not expensive extra view (such as an extra top view) for an apparatus having a static gantry (e.g. using a pass-through and/or a conveyor mode described in greater detail below) and a single generator, or at least one relatively not expensive extra view (such as an extra side view) for an apparatus having a mobile detection system (e.g. using a scan mode) and a single generator. The system and apparatus may provide at least one relatively not expensive extra view (such as a view without parallax) for an apparatus having a single generator.

In some embodiments, the throughput of a scan mode, i.e. the number of loads 4 inspected by unit of time, may be of 20 to 30 loads/hour. Alternatively or additionally, the throughput of a pass-through mode may be higher than the throughput in the scan mode, and may be for example of from 50 to 200 loads/hour.

In some embodiments and as shown in FIG. 7, a method for inspecting one or more loads comprises:

- emitting, at S1, secondary electromagnetic radiation for inspection of the load, in response to a secondary source of radiation being irradiated by primary electromagnetic radiation from a primary generator of electromagnetic radiation;
- optionally collimating, at S2, the secondary electromagnetic radiation into a secondary inspection beam for irradiation of the load; and
- detecting, at S3, radiation from the load after interaction with the secondary inspection beam.

In some embodiments, the emitting performed at S1 may be performed by the source 2 of the system of any one of the aspects of the disclosure.

In some embodiments, the optional collimating performed at S2 may be performed by the collimator 3 of the system of any one of the aspects of the disclosure.

In some embodiments, the detecting performed at S3 may be performed by the one or more detectors of the system of any one of the aspects of the disclosure.

In some embodiments, the generation of the primary electromagnetic radiation may be performed by the generator 1 of the apparatus of any one of the aspects of the disclosure.

In some examples, the apparatus and/or the system may comprise an imager (not shown on the Figures) configured to receive data from the one or more detectors 5 to generate one or more images as shown in FIG. 8A (for example a top view from a system as shown in FIG. 2) and FIG. 8B (for example a top view from a system similar to the system as shown in FIG. 5, but along the axis OZ). The imager conventionally comprises at least a processor and a memory.

In some examples, the method illustrated in FIG. 7 may optionally comprise, at S4, inspecting with the primary radiation one or more of the same loads as (or one or more other loads from) the one or more loads inspected by the system 100.

In some examples, inspecting, at S4, the one or more loads with the primary electromagnetic radiation may comprise:

- generating an inspection beam of primary electromagnetic radiation for irradiation of the one or more loads to inspect;
- collimating the inspection beam of primary electromagnetic radiation for irradiation of one or more loads; and
- detecting radiation from the one or more loads after interaction with the inspection beam of primary electromagnetic radiation.

At S4 the inspection may be carried out e.g. by transmission of the primary radiation through the load to inspect.

In some embodiments, the inspection of the one or more loads by the primary electromagnetic radiation may be performed by the apparatus of any one of the aspects of the disclosure.

In some embodiments, the generation of the inspection beam may be performed by the generator 1 of the apparatus of any one of the aspects of the disclosure.

In some embodiments, the collimating performed at S4 may be performed by the primary collimator 14 of the apparatus of any one of the aspects of the disclosure.

In some embodiments, the detecting performed at S4 may be performed by the one or more primary detectors 51 of the apparatus of any one of the aspects of the disclosure.

In some examples, the imager may be configured to receive data from the one or more primary detectors 51 to generate one or more images.

In some examples the imager may perform, at least partly, some of the steps of an example method according to the disclosure.

In another aspect of the present disclosure, there is described a computer program product comprising program instructions to program a processor to carry out a method according to any aspect of the disclosure, or to program a processor to provide a system and/or apparatus and/or imager of any aspect of the disclosure.

MODIFICATIONS AND VARIATIONS

In some examples, the apparatus 1000 may be mobile and may be transported from a location to another location (the apparatus 1000 may comprise an automotive vehicle). Alternatively or additionally, the apparatus 1000 may be static with respect to the ground and cannot be displaced.

Examples of pass-through modes of operation include the load being a vehicle such as a truck. In some examples, a driver of the vehicle may drive the truck through the detection system, e.g. including a gantry. In some examples (e.g. where the radiation is relatively high), the apparatus may comprise a conveyor configured to carry the vehicle (such as the truck) through the system, e.g. at low speed (e.g. lower than 5 km/h). The above mode of operation is sometimes referred to as a "conveyor" mode of operation.

In some examples, the generator 1 may emit successive radiation pulses. The pulses may be emitted at a given frequency, comprised between 50 Hz and 1000 Hz, for example approximately 200 Hz. In some examples, the generator 1 may be configured to emit the radiation as a continuous emission (e.g. the generator 1 may comprise an X-ray tube).

According to some examples, some of the detectors may be mounted on a gantry, as shown in FIG. 2. The gantry for example forms an inverted "L" extending in the median plane XOZ. In mobile inspection systems and/or apparatuses, the gantry may comprise an electro-hydraulic boom which can operate in a retracted position in a transport mode (not shown on the Figures) and in an inspection position (FIG. 2). The boom may be operated by hydraulic actuators (such as hydraulic cylinders). In static inspection systems, the gantry may comprise a static structure.

It should be understood that the inspection radiation generator may comprise sources of other radiation.

The inspection radiation source may also comprise sources which are not adapted to be activated by a power supply, such as radioactive sources, such as using $Co_{60}$ or $Cs_{137}$. In some examples, the inspection system may comprise other types of detectors, such as optional gamma and/or neutrons detectors, e.g., adapted to detect the presence of radioactive gamma and/or neutrons emitting materials within the load, e.g., simultaneously to the X-ray inspection.

In some examples, one or more memory elements (e.g., the memory of the imager or a memory element of the processor) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

As one possibility, there is provided a computer program, computer program product, or computer readable medium, comprising computer program instructions to cause a programmable computer to carry out any one or more of the methods described herein. In example implementations, at least some portions of the activities related to the imager and/or the detector may be implemented in software. It is appreciated that software components of the present disclosure may, if desired, be implemented in ROM (read only memory) form. The software components may, generally, be implemented in hardware, if desired, using conventional techniques.

Other variations and modifications of the system will be apparent to the skilled in the art in the context of the present disclosure, and various features described above may have advantages with or without other features described above. The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An inspection system comprising:

at least one secondary source of radiation configured to emit secondary electromagnetic radiation for inspection of a load by transmission of the secondary inspection radiation through the load, the secondary source of radiation being configured to generate the secondary inspection radiation in response to being irradiated by primary electromagnetic radiation from at least one primary generator of electromagnetic radiation, the secondary electromagnetic radiation and the primary electromagnetic radiation respectively comprising at least one of X-ray radiation, gamma radiation, or neutron radiation, the at least one secondary source of radiation comprising a plurality of scattering elements, each scattering element comprising a distinct scattering component with a scattering thickness, at least one of the scattering elements being different in at least one of a respective scattering thickness or scattering material from one or more other scattering elements; and one or more detectors configured to detect radiation from the load after interaction with the secondary inspection radiation.

2. The system of claim 1, wherein the secondary source comprises:

a target for a beam of primary electromagnetic radiation forming a pencil of rays and/or a fan beam.

3. The system of claim 1, further comprising a collimator configured to collimate the secondary electromagnetic radiation into a secondary inspection beam configured to irradiate the load.

4. The system of claim 1, wherein the secondary source of radiation is configured to generate ionizing secondary electromagnetic radiation in response to being irradiated by primary electromagnetic radiation.

5. The inspection system of claim 1, wherein the at least one primary generator is further configured to form an inspection beam of primary electromagnetic radiation for irradiating one or more loads to be inspected.

6. An apparatus, comprising:

at least one inspection system comprising:

at least one secondary source of radiation configured to emit secondary electromagnetic radiation for inspection of a load by transmission of the secondary inspection radiation through the load, the secondary source of radiation being configured to generate the secondary inspection radiation in response to being irradiated by primary electromagnetic radiation from at least one primary generator of electromagnetic radiation, the secondary electromagnetic radiation and the primary electromagnetic radiation respectively comprising at least one of X-ray radiation, gamma radiation, or neutron radiation, the at least one secondary source of radiation comprising a plurality of scattering elements, each scattering element comprising a distinct scattering component with a scattering thickness, at least one of the scattering elements being different in at least one of a respective scattering thickness or scattering material from one or more other scattering elements; and one or more detectors configured to detect radiation from the load after interaction with the secondary inspection radiation; and at least one primary generator configured to generate primary electromagnetic radiation, the at least one primary generator configured to form an inspection beam of primary electromagnetic radiation for irradiating one or more loads to be inspected and configured to form a second beam of primary electromagnetic radiation to irradiate the at least one secondary source of radiation.

7. The apparatus of claim 6, wherein the primary generator comprises:

a collimator for collimating the second beam of primary electromagnetic radiation for irradiation of the secondary source of electromagnetic radiation.

8. The apparatus of claim 6, wherein the secondary electromagnetic radiation is for irradiation of one or more loads to inspect.

9. The apparatus of claim 8, wherein the one or more loads to inspect by the inspection beam of primary electromagnetic radiation comprise one or more first loads, and wherein the one or more loads to inspect by the secondary electromagnetic radiation comprise one or more second loads.

10. The apparatus of claim 9, wherein the one or more first loads are different loads from the one or more second loads.

11. The apparatus of claim 6, wherein the primary generator comprises a primary collimator for collimating the inspection beam of primary electromagnetic radiation for irradiation of one or more loads.

12. The apparatus of claim 6, wherein the primary generator is configured to generate the primary inspection radiation for inspection by transmission of the inspection beam of primary electromagnetic radiation through a load to inspect.

13. The apparatus according to claim 6, further comprising:

one or more primary detectors configured to detect radiation from one or more loads after interaction with the inspection beam of primary electromagnetic radiation.

14. The apparatus of claim 13, wherein a plane defined by the one or more primary detectors is distant from a plane defined by the one or more detectors of each of the at least one inspection system.

15. The apparatus of claim 13, wherein:

the one or more primary detectors are configured to define a primary main direction of detection, and the one or more detectors of each of the at least one inspection system are configured to define a secondary main direction of detection.

16. The apparatus of claim 15, wherein the primary main direction of detection and the secondary main direction of detection define an angle between them.

17. A method of inspection of a load, comprising:

generating secondary electromagnetic radiation, for inspection of a load by transmission of the secondary inspection radiation through the load, in response to a secondary source of radiation being irradiated by primary electromagnetic radiation from a primary generator of electromagnetic radiation, the secondary electromagnetic radiation and the primary electromagnetic radiation respectively comprising at least one of X-ray radiation, gamma radiation, or neutron radiation, the at least one secondary source of radiation comprising a plurality of scattering elements, each scattering element comprising a distinct scattering component with a scattering thickness, at least one of the scattering elements being different in at least one of a respective scattering thickness or scattering material from one or more other scattering elements; and detecting radiation from the load after interaction with the secondary inspection radiation.

18. The method of inspection of a load of claim 17, further including generating the primary electromagnetic radiation from a primary generator of electromagnetic radiation, the primary generator forming an inspection beam of primary electromagnetic radiation for irradiating one or more loads to be inspected and forming a second beam of primary electromagnetic radiation to irradiate the secondary source of radiation.

* * * * *